United States Patent
Hornig, deceased et al.

[15] 3,687,993
[45] Aug. 29, 1972

[54] GOLD HYDROXYDIACETATE AND PROCESS FOR ITS MANUFACTURE

[72] Inventors: Lothar Heinz Hornig, deceased, late of Frankfurt am Main in Schwanheim, Germany by Anneliese Hornig, nee Munich, co-heiress; Hans-Jurgen Arpe, Fischbach, Taunus, Germany

[73] Assignee: Farbwerke Hoechst Aktiengesellschaft, Frankfurt am Main, Germany

[22] Filed: July 29, 1971

[21] Appl. No.: 167,431

Related U.S. Application Data

[63] Continuation-in-part of Ser. No. 786,541, Dec. 5, 1968, abandoned.

[30] Foreign Application Priority Data

Dec. 12, 1967  Germany..........P 16 68 057.2

[52] U.S. Cl..................................260/430, 252/431

[51] Int. Cl. .............................................C07f 1/12
[58] Field of Search......................................260/430

[56] References Cited

UNITED STATES PATENTS 1,939,621  12/1933  Bruson.......................260/11

*Primary Examiner*—Tobias E. Levow
*Assistant Examiner*—H. M. S. Sneed
*Attorney*—Curtis, Morris & Safford

[57] ABSTRACT

Solid gold hydroxydiacetate of the formula $Au(OH)(O_2CCH_3)_2$ which is well suitable as catalyst or catalyst component for oxidation reactions. The novel compound can be obtained by preparing an aqueous solution containing gold ions and acetate ions, removing the solvent, dissolving the residue obtained in a polar solvent precipitating the gold hydroxydiacetate by adding a non polar solvent and isolating it.

7 Claims, No Drawings

GOLD HYDROXYDIACETATE AND PROCESS FOR ITS MANUFACTURE

This application is a continuation-in-part of Ser. No. 786,541, filed Dec. 5, 1968, which is now abandoned.

The present invention relates to gold hydroxydiacetate and to a process for its preparation. Gold hydroxydiacetate of the formula $Au(OH)(O_2CCH_3)_2$ is a novel compound of gold which has especially favorable properties of use as catalyst or as catalyst component for homogeneous or heterogeneous reactions. Moreover, it may be used as starting substance for the manufacture of other organic gold compounds. It can be reacted, for example, with propionic acid to give gold hydroxydipropionate or with other carboxylic acids or with complex forming agents, such as acetylacetone, to yield the corresponding gold compounds. For the preparation of double salts or of complex compounds with other salts, alkali metal salts, for example, may be added to the solution of gold hydroxydiacetate, and the mixture obtained may then be concentrated.

The catalytic and co-catalytic properties of gold in the form of its salts or complex compounds or in the form of elemental metal have been studied, especially recently, with oxidation reactions and reactions combined with an oxidation reaction, such as acetoxylation of olefins and aromatic compounds. Especially the preparation of catalysts for the manufacture of vinyl acetate or phenyl acetate with the aid of palladium-gold catalysts in the gaseous phase constitutes a specific application of gold salts and complex compounds of gold.

In the aforesaid reactions, the catalysts must have a high purity, i.e. certain anions must be absent, for example, chloride, bromide or cyanide ions. Chloride ions or chlorine-containing compounds may inhibit catalytic reactions, for example in the production of phenyl acetate. Some other compounds may also act as catalyst poison, for example nitrogen compounds such as amines, amides and cyanides; phosphorus compounds such as phosphates, phosphine complex compounds; or sulfur compounds such as sulfates, sulfones, sulfoxides and sulfides. It is, therefore, very important for the activity, selectivity and life period of catalysts of the aforesaid kind that these interfering compounds are excluded if possible in the preparation of the catalyst, for example during impregnation of the carrier material, because even by very careful washing the said inhibitors cannot be removed or can be removed quantitatively or substantially with difficulty only.

The difficulties with catalytic reactions caused by the presence of interfering, foreign ions can be avoided for the first time by using the gold hydroxydiacetate of the present invention. A further important advantage of the gold hydroxydiacetate resides in the fact that it is now possible to apply the different catalyst components to a carrier material in one process stage and thus to avoid heterogeneities in the distribution of the catalyst components.

Apart from alkali metal aurates, such as potassium aurate, which is only stable in alkaline solution and, consequently, does not permit the simultaneous presence of many metal salts in dissolved form, whereby it is unsuitable for impregnating carrier materials with metal salt mixtures, there are described in literature no gold compounds soluble in neutral or acid aqueous medium or in organic solvents which are free from the aforesaid interfering inhibitors.

The present invention also provides a process for the preparation of gold hydroxydiacetate which comprises preparing a water-containing solution of gold ions and acetate ions, removing the solvent in known manner, dissolving the residue obtained in a polar solvent, precipitating the gold hydroxydiacetate by adding a non polar solvent and isolating it.

As the sources of gold ions are well known in the art, the preparation of same poses no problems. Illustrative gold ions which are suitable in the present process and well known are illustrated in various handbooks such as Gmelins', *Handbuch der Anorganischen Chemie*, System No. 62, 8th Edition, Verlag Chemie, Weinheim-Bergstrasse, pp. 672 et seq. (1954). In this handbook the preparation of gold (III)-hydroxide, which is the preferred gold ion source, is amply illustrated. Thus, to a solution of $H[AuCl_4]$ is added a $Na_2CO_3$ solution, and the mixture is heated to obtain the gold hydroxide.

The tetrachloroauric (III) acid, i.e. $H[AuCl_4]$, is obtained from $AuCl_3$ as illustrated in *International Encyclopedia of Chemical Science*, Van Nostrand Co. Inc., p. 500 (1964).

The obtained gold hydroxide is washed carefully to remove all anions other than hydroxyl anions. In order to force more gold hydroxide in solution, it may be dissolved in an acid such as an acetic acid, cf. Sneed et al., *Comprehensive Inorganic Chemistry*, Vol. 2, Van Nostrand Co. Inc. pp. 221-2, 226-7 (1964). Other water soluble gold compounds may be employed to obtain the gold hydroxide, e.g. $AuCl_3$, $KAuCl_4$ or $Au(NO_3)_3$. For purposes of the present invention, the acid solution used to force the gold ions into solution should contain no interfering or catalytically inhibiting ions.

The preparation of gold hydroxydiacetate is carried out as follows. The gold hydroxide or gold oxyhydrate serving as precursor is rapidly precipitated from the aqueous solution of a gold compound at a temperature within the range of from 60° to 100°C, preferably within the range of from 70° to 80°C, by the addition of an alkali metal carbonate. Thereafter, the finely divided precipitate is washed with distilled water until free from interfering ions, separated, dissolved in glacial acetic acid at a temperature within the range of from 70° to 120°C, preferably at 90° to 100°C, and then the acetate solution evaporated at room temperature. The precipitate is dissolved in a polar solvent, whereby the gold hydroxydiacetate is precipitated by the addition of a non polar solvent and the novel compound isolated.

As mentioned above, gold hydroxide is prepared from a water-soluble gold salt, for example, $AuCl_3$, $HAuCl_4$, $KAuCl_4$, or $Au(NO_3)_3$; the gold salt solution is mixed with a stoichiometrical excess of up to 25 mol percent, preferably 10 mol percent, of alkali metal carbonate such as sodium carbonate or potassium carbonate; the mixture is heated to a temperature within the range of 60° to 100°C, preferably within the range of 70° to 80°C. At this temperature the finely divided gold hydroxide rapidly precipitates. After a short time, if possible within 30 minutes, preferably after about 5 minutes, the precipitate is cooled, together with the solution, at room temperature. Heating longer than 30 minutes and temperatures higher than 100°C cause aging of the gold hydroxide precipitate, which becomes evident by a reduced solubility in acetic acid.

The gold hydroxide suitable for the subsequent reaction to produce gold hydroxydiacetate can be obtained from an alkaline potassium aurate solution when said potassium aurate solution is previously acidified with a dilute mineral acid, for example hydrochloric acid, until the gold hydroxide precipitate has redissolved and the solution is then precipitated with alkali metal carbonate.

It is advantageous to separate the gold hydroxide precipitate immediately by filtration and to wash it carefully with large amounts of distilled warm water of 30° to 50°C until it is free from interfering ions. It is advisable to dissolve the gold hydroxide precipitate in acetic acid and to re-precipitate it with alkali metal carbonates. All the procedural steps must be carried out as rapidly as possible in order to avoid the undesired aging of the gold hydroxide.

A non-aged gold hydroxide prepared by the above-described method is soluble in an excess amount of glacial acetic acid by heating to a temperature in the range of 70° to 120°C, preferably in the range of 90° to 100°C. The solution has a greenish tint owing to the presence of a small amount of very finely divided metallic gold.

An aged gold hydroxide precipitate is, however, only incompletely soluble in glacial acetic acid, whereby large portions are reduced to form metallic gold.

The water-containing gold hydroxydiacetate solution is concentrated at a temperature in the range of from 0° to 30°C in a suitable device, for example in a rotary evaporator, and traces of glacial acetic acid are removed in a vacuum exsiccator over potassium hydroxide. The yellow-brown amorphous product obtained is taken up in a small amount of a polar solvent, for example a dialkyl ketone, preferably acetone or methylethyl ketone, and the gold hydroxydiacetate is precipitated in the form of a finely divided yellow-brown salt by adding a non-polar solvent, for example aliphatic, cycloaliphatic or aromatic hydrocarbons having a boiling point below 85°C, preferably cyclohexane or a low boiling petroleum ether.

It is surprising that gold hydroxydiacetate can be prepared in the manner described above although it is known that gold compounds are very unstable in the presence of organic compounds and that they are readily reduced to the metal. Moreover, it is very surprising that a compound of the formula Au(OH) (O$_2$CCH$_3$) exists as neither a non-complex nor a complex compound of gold is known which, besides one or several organic radicals, only contains oxygen as heteroatom.

The gold hydroxydiacetate is readily soluble in water and in aliphatic carboxylic acids of low molecular weight, such as acetic acid, propionic acid or isobutyric acid. The initially good solubility of the amorphous gold hydroxydiacetate in acetone or methylethyl ketone diminishes when it has been transformed into a crystalline compound of the same chemical composition by precipitation with petroleum ether or cyclohexane. Gold hydroxydiacetate is well soluble in alcohols, for example methanol, ethanol, isopropanol or in solvent mixtures containing the said alcohols. In solution of this kind the gold hydroxydiacetate is, however, rapidly reduced to metallic gold. The gold hydroxydiacetate is insoluble at room temperature in aliphatic, cycloaliphatic and aromatic hydrocarbons.

The gold hydroxydiacetate can be clearly characterized by a carbon, hydrogen, oxygen and gold analysis as shown in the following example and has the formula Au(OH) (O$_2$CCH$_3$)$_2$. The infrared analysis shows bands characteristic for heavy metal acetates. When the gold hydroxydiacetate is heated in air it slowly sinters at a temperature in the range of from 60° to 100°C while turning dark.

The following example serves to illustrate the invention, but it is not intended to limit it thereto.

EXAMPLE

Twenty milliliters of acetic acid of 96 percent strength containing 58 milligrams of gold, partially in ionic form as Au(OH)$_3$, partially dissolved in colloidal form, and therefore having a greenish tint, was filtered and freed from acetic acid at room temperature in a rotary evaporator.

To remove traces of acetic acid from the amorphous glassy yellow-brown residue it can be placed in a vacuum exsiccator containing potassium hydroxide.

A more rapid removal of the residual acetic acid from the gold hydroxydiacetate was carried out as follows:

The glassy residue was dissolved in about 5 milliliters of cold acetone, the solution was filtered and the gold hydroxydiacetate was precipitated in the form of a fine yellow-brown powder by adding about 20 milliliters of cyclohexane. The remaining solvent was removed by evacuation for 2 hours under a pressure of about 0.1 mm of mercury. The yield amounted to 0.42 gram, corresponding to 43 percent of the theory. As mainly metallic gold was obtained as by-product, the yield in the preparation of gold hydroxydiacetate was almost quantitative, calculated on the amount of gold used. The gold hydroxydiacetate prepared in this manner had the following composition:

| Percentage by weight | Analytically | Theoretically |
|---|---|---|
| C | 14.4/14.1 | 14.45 |
| H | 2.0/2.1 | 2.11 |
| O | 20.1/20.1 | 24.1 |
| Au | 60.15 | 59.32 |

What is claimed is:
1. Solid gold hydroxydiacetate of the formula Au(OH) (O$_2$CCH$_3$)$_2$.
2. A process for the manufacture of solid gold hydroxydiacetate of the formula AU(OH) (O$_2$CCH$_3$)$_2$, which comprises preparing a water-containing solution containing gold ions and acetate ions, removing the water-containing acetic acid by distillation, dissolving the residue obtained in a polar solvent, precipitating the gold hydroxydiacetate by adding a non-polar solvent and isolating the gold hydroxydiacetate.
3. The process of claim 2, wherein the water-containing acetic acid solution contains, besides gold and acetate ions, substantially no other metal ions or acid anions.
4. The process of claim 2, wherein a dialkyl ketone is used as a polar solvent.

5. The process of claim 4, wherein the dialkyl ketone is acetone or methylethyl ketone.

6. The process of claim 2, wherein an aliphatic, cycloaliphatic or an aromatic solvent having a boiling point below 85°C is used as a non-polar solvent.

7. The process of claim 6, wherein the solvent is cyclohexane or a low boiling petroleum ether.

* * * * *